US012116134B2

(12) United States Patent
Aubrun et al.

(10) Patent No.: US 12,116,134 B2
(45) Date of Patent: Oct. 15, 2024

(54) AIRCRAFT SEAT (71) Applicant: SAFRAN ELECTRONICS & DEFENSE ACTUATION, Auxerre (FR)

(72) Inventors: Julien Aubrun, Cergy (FR); Joffrey Delong, Paris (FR); Miguel Piris, La Houssaye-en-Brie (FR); Olivier Gueroult, Argenteuil (FR); Emmanuel Berdah, Aubervillers (FR); Loic Bouet, Montfort-l'Amaury (FR)

(73) Assignee: SAFRAN ELECTRONICS & DEFENSE ACTUATION, Auxerre (FR)

( * ) Notice: Subject to any disclaimer, the term of this patent is extended or adjusted under 35 U.S.C. 154(b) by 229 days.

(21) Appl. No.: 17/778,620

(22) PCT Filed: Nov. 18, 2020

(86) PCT No.: PCT/FR2020/052116
§ 371 (c)(1),
(2) Date: May 20, 2022

(87) PCT Pub. No.: WO2021/099737
PCT Pub. Date: May 27, 2021

(65) Prior Publication Data
US 2023/0002058 A1 Jan. 5, 2023

(30) Foreign Application Priority Data
Nov. 22, 2019 (FR) ..................................... 1913133

(51) Int. Cl.
*B60N 2/18* (2006.01)
*B64D 11/06* (2006.01)
(Continued)

(52) U.S. Cl.
CPC ............ *B64D 11/064* (2014.12); *F16B 43/00* (2013.01); *B60N 2/1665* (2013.01); *B60N 2/1878* (2013.01); *B64D 11/0696* (2013.01)

(58) Field of Classification Search
CPC ... B64D 11/064; B60N 2/1665; B60N 2/1878
See application file for complete search history.

(56) References Cited

U.S. PATENT DOCUMENTS 4,830,530 A * 5/1989 Meineke ............. H05K 7/1412
292/256.75
5,002,172 A 3/1991 Stringer
(Continued)

FOREIGN PATENT DOCUMENTS

EP       2765322 A1    8/2014
WO   2015/104378 A2    7/2015

OTHER PUBLICATIONS

Written Opinion of the International Searching Authority mailed Mar. 9, 2021, issued in corresponding International Application No. PCT/FR2020/052116, filed Nov. 18, 2020, 6 pages.
(Continued)

*Primary Examiner* — Syed A Islam
(74) *Attorney, Agent, or Firm* — Christensen O'Connor Johnson Kindness PLLC (57) ABSTRACT

An aircraft seat includes an actuator and a movement transmission device. The movement transmission device includes a frame having at least one bearing face and one braking face; a drive body configured to being rotated relative to the frame, the drive body having a bearing face and a braking face; and an elastic element suitable for keeping the braking face of the drive body at a defined distance from the braking face of the frame, the elastic element having a determined stiffness and being prestressed such that, when an axial load greater than a threshold load (Continued)

is applied to the drive body, the braking face of the drive body comes into contact with the at least one braking face of the frame.

14 Claims, 5 Drawing Sheets

(51) Int. Cl.
*F16B 43/00* (2006.01)
*B60N 2/16* (2006.01)

(56) References Cited

U.S. PATENT DOCUMENTS

| | | | |
|---|---|---|---|
| 5,002,418 A * | 3/1991 | McCown | H05K 7/1412 |
| | | | 410/82 |
| 2018/0105072 A1 | 4/2018 | Pons | |
| 2020/0189739 A1* | 6/2020 | Schultz | B60N 2/66 |

OTHER PUBLICATIONS

International Preliminary Report on Patentability mailed May 17, 2022, issued in corresponding International Application No. PCT/FR2020/052116, filed Nov. 18, 2020, 1 page.
International Search Report mailed Mar. 9, 2021, issued in corresponding International Application No. PCT/FR2020/052116, filed Nov. 18, 2020, 2 pages.
Written Opinion of the International Searching Authority mailed Mar. 9, 2021, issued in corresponding International Application No. PCT/FR2020/052116, filed Nov. 18, 2020, 5 pages.

* cited by examiner

AIRCRAFT SEAT

CROSS-REFERENCES TO RELATED APPLICATIONS

This application is a National Stage of International Application No. PCT/FR2020/052116, filed Nov. 18, 2020, which claims priority to French Patent Application No. 1913133, filed Nov. 22, 2019, the entire disclosures of which are hereby incorporated by reference in their entirety.

TECHNICAL FIELD OF THE DISCLOSURE

Embodiments of this disclosure relate to the field of aircraft seats.

BACKGROUND

In an aircraft, the seats can be moved relative to the ground by drive systems. These drive systems include an actuator and a transmission chain. The mechanical parts of these drive systems must be able to withstand loads corresponding to a sudden stop situation (generally called a "crash") without the mechanical parts breaking and possibly injuring a passenger. The seat must therefore withstand thrusts of 9 to 16 g during a sudden stop. These mechanical parts must also be able to withstand sudden significant and repeated loads, experienced for example when the aircraft regains lift after passing through an air pocket or when an obese person drops violently on the seat. When faced with these situations, the mechanical parts of the transmission chain must neither break nor wear out prematurely, in order to limit the number of ground stops for maintenance purposes.

To achieve this objective, the mechanical parts of aircraft drive systems are overdesigned. However, this overdesign increases both the manufacturing cost of the mechanical parts and the weight of the aircraft. It is desirable to reduce the weight of the aircraft in order to reduce the amount of kerosene required to complete a given trip, and thus limit the cost of air transport and preserve the environment.

It is also known, for example from document WO 2015/104378, to insert a mechanism for locking and unlocking the kinematic drive chain of a seat element. Embodiments of the disclosure improve the situation.

SUMMARY

The disclosure relates to an aircraft seat comprising at least one actuator capable of generating movement and at least one movement transmission device comprising:
 a frame provided with a through-bore extending in an axial direction, the frame comprising at least one bearing face and at least one braking face;
 a drive body suitable for being rotated relative to the frame about an axis extending in an axial direction, the drive body being arranged in the bore to move freely in translation along at least the axial direction relative to the frame, the drive body comprising at least one bearing face extending facing the bearing face of the frame and at least one braking face extending facing at least part of the braking face of the frame; and
 at least one elastic element arranged between the at least one bearing face of the frame and the at least one bearing face of the drive body in order to keep the at least one braking face of the drive body at a defined distance from the at least one braking face of the frame, the at least one elastic element having a determined stiffness and being prestressed such that, when an axial load greater than a threshold load is applied to the drive body, the elastic element is compressed and the at least one braking face of the drive body comes into contact with the at least one braking face of the frame.

The aircraft seat according to the disclosure comprises a transmission device which makes it possible to counter an excessively large force so that the actuator and the mechanical parts of the transmission system do not need to withstand this force. Countering this force is carried out through a dedicated path of operation and eliminates the need to overdesign the normal path of operation.

Advantageously, the transmission device is a purely mechanical system which does not require any external supply of energy. It does not require a control and execution system in order to operate. The transmission device is inserted into any rotary transmission system and does not interfere with its operation. Due to its locking servo function as well as its adaptability, the transmission device of the aircraft seat allows designing the actuator and the mechanical parts of the transmission system and ultimately allows savings in weight and/or a reduction in the technical requirements of the main transmission function.

The features set forth in the following paragraphs may optionally be implemented. They may be implemented independently of each other or in combination with each other.

The elastic element comprises at least one spring washer;

The elastic element comprises two Belleville washers mounted in opposition to each other;

The transmission device comprises at least one bearing arranged between the bearing face of the frame and the at least one elastic element;

The drive body comprises a ball screw nut, a ball screw suitable for being driven in translation by the ball screw nut, a cylindrical casing which lies in the extension of the ball screw nut, the cylindrical casing comprising a first end integral with the ball screw nut and a second free end, and a radial wall integral with at least one end of the cylindrical casing, the at least one braking face and the at least one bearing face of the drive body being arranged on the radial wall;

The seat comprises a closure nut suitable for being made integral with the second end of the cylindrical casing, the closure nut being capable of prestressing the at least one elastic element;

The braking face and bearing face of the drive body are arranged on a radial face of the closure nut;

The cylindrical casing comprises a crown extending axially from the end of the radial wall, the crown being able to be fixed to the ball screw nut;

The frame comprises at least one internal shoulder contained in a first radial plane and at least one peripheral shoulder arranged around the at least one internal shoulder and contained in a second radial plane, the second radial plane being offset axially relative to the first radial plane; and the at least one bearing face of the frame is formed by the at least one internal shoulder and the at least one braking face of the frame is formed by the at least one peripheral shoulder.

The transmission device comprises a support ring arranged around the cylindrical casing, the support ring forming the radial wall, the bearing face of the drive body being a radial face of the support ring.

The support ring is provided with a peripheral flange extending axially, the end face of the peripheral flange forming the braking face of the drive body.

The frame comprises a bearing face extending radially, and the transmission device comprises a bearing and a thrust washer which are arranged in the bore around the drive body; the bearing having an inner ring and an outer ring, the outer ring of the bearing resting against the bearing face of the frame, the thrust washer resting against the inner ring of the bearing.

The transmission device further comprises a braking ring provided with a skirt extending radially inwards, a radial face of the skirt being arranged facing the braking face of the drive body, a portion of the radial face of the skirt forming the braking face of the frame.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The drawings and the description below contain elements that for the most part are certain in nature. Therefore not only may they serve to provide a better understanding of this disclosure, but they may also contribute to its definition where appropriate.

Figure 1:
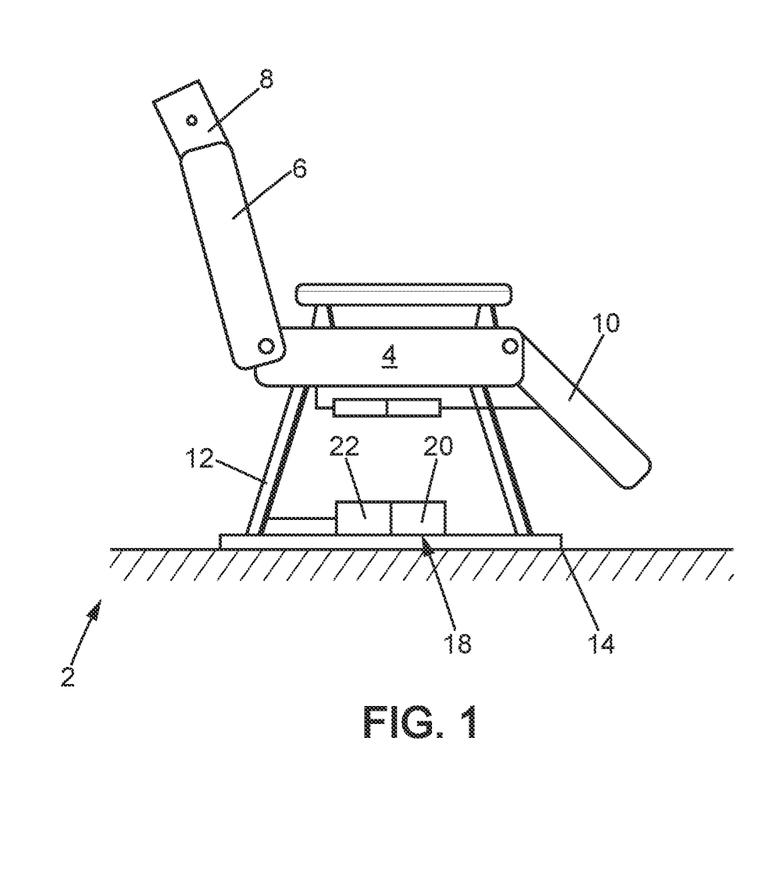
FIG. 1 is a schematic side view of a seat of an aircraft according to the disclosure.

Referring to FIG. 1, an example of an aircraft seat 2 according to the disclosure is represented. It comprises a seat base 4, a backrest 6 pivotally mounted relative to the seat base 4, a headrest 8 pivotally mounted relative to the backrest 6, a leg rest 10, feet 12, and slides 14 fixed to the floor. The feet 12 of the seat are capable of sliding in the slides 14 in order to move the seat 2 forwards or backwards. The seat 2 has an electric drive system 18 dedicated to moving the seat 2 in the slides. The drive system 18 comprises, for example, an actuator 20, a transmission device 22 for transmitting the movement generated by the actuator, and mechanical parts suitable for transmitting the movement to the feet 12 of the seat. These mechanical parts include, for example, gears, connecting rods, a rack, etc. These are not represented in the FIGURES.

Figure 2:
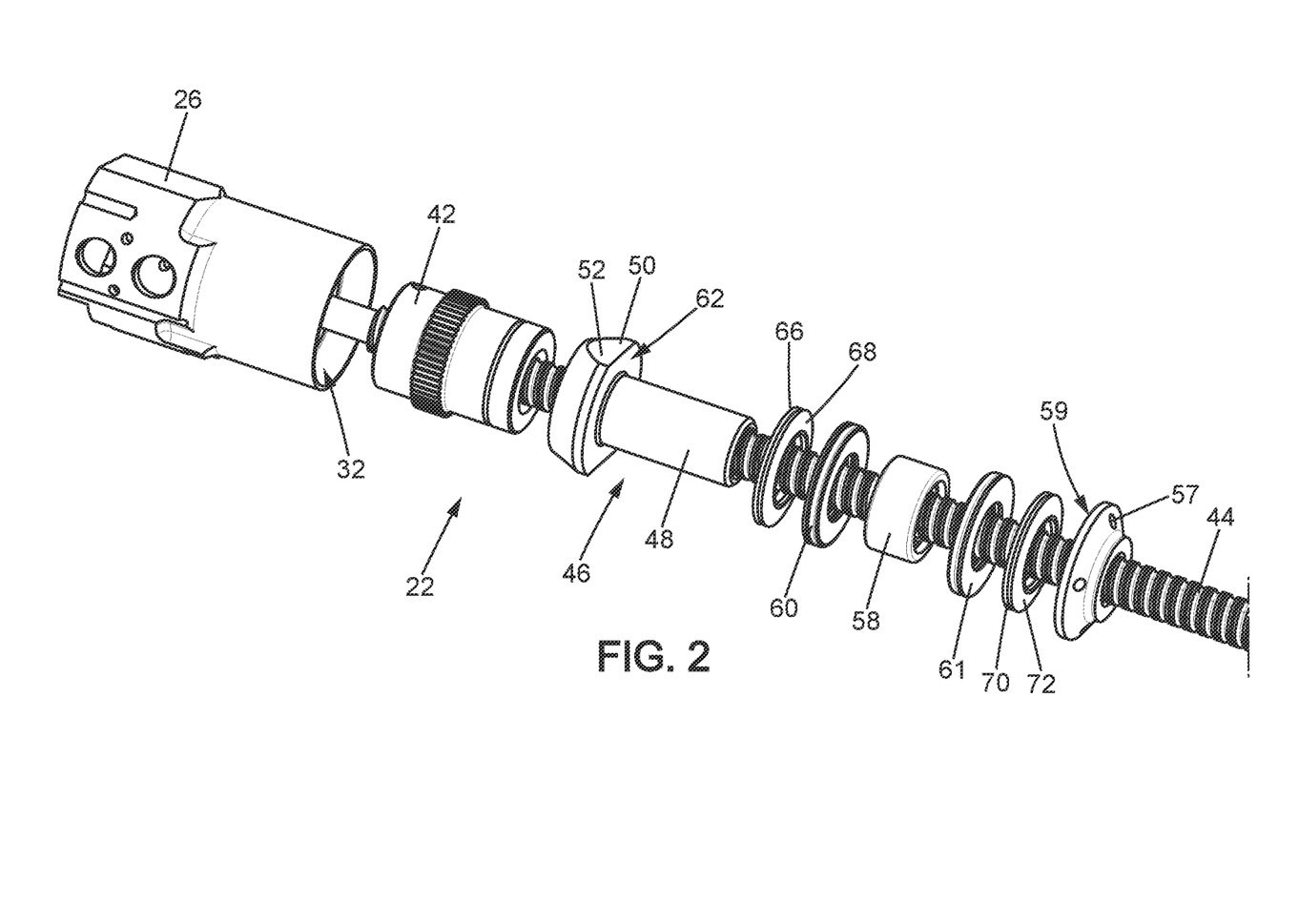
FIG. 2 is an exploded perspective view of a first embodiment of a transmission device for the seat shown in FIG. 1.

The present patent application is described with reference to an orthogonal frame of reference (O, x, y, z) represented in FIGS. 2 and 3. In this frame of reference, the axial direction is defined by the x direction, the radial plane is defined by the (y, z) frame of reference.

In the present patent application, the term "input 23" designates the side of the transmission device receiving the driving movement and located towards the actuator 20. The term "output 24" designates the side of the transmission device transmitting the drive movement and located towards the feet 12 of the seat.

Figure 3:
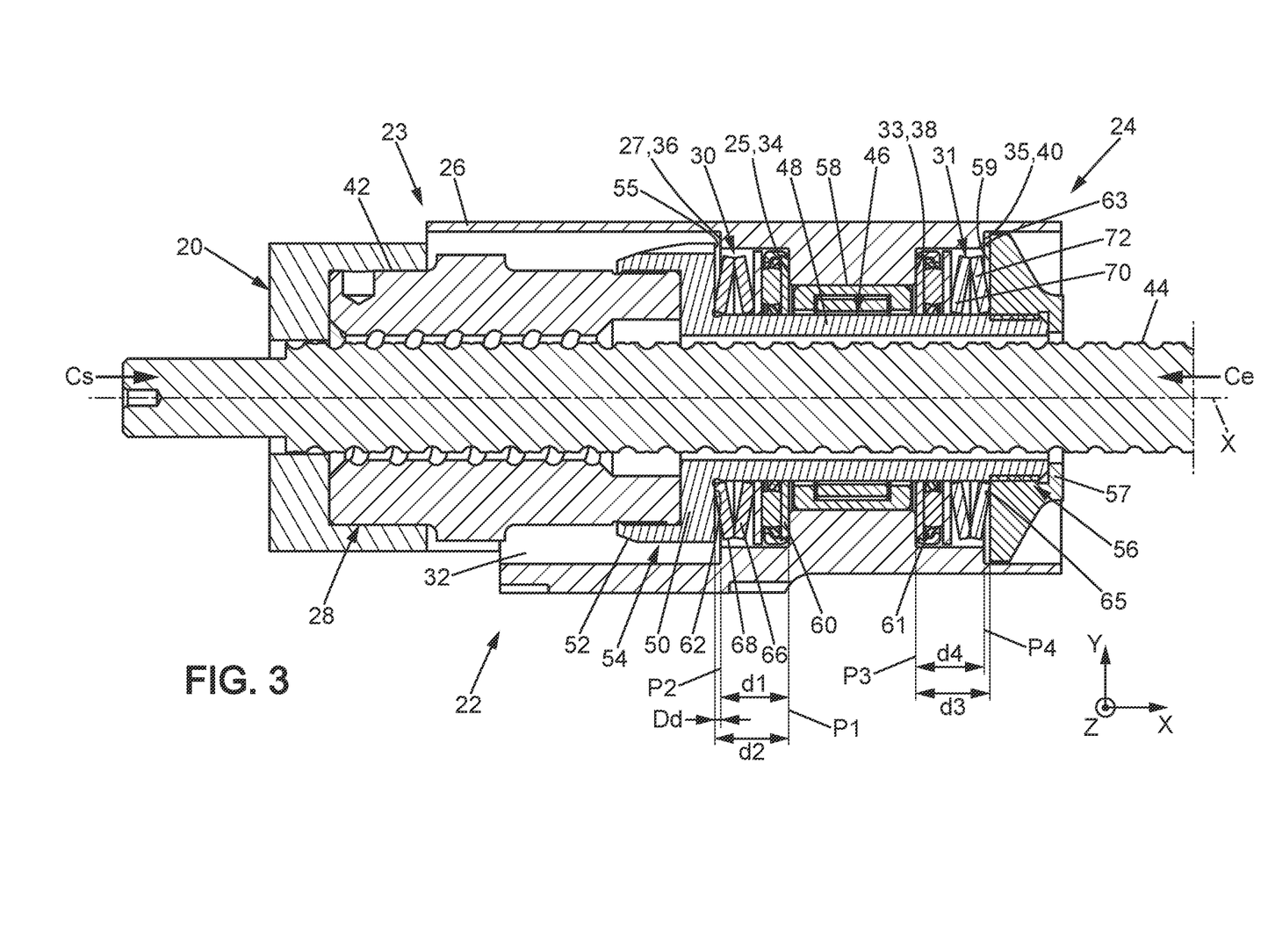
FIG. 3 is an axial section of the transmission device illustrated in FIG. 2, when the transmission device is in a rest position.
Figure 5:
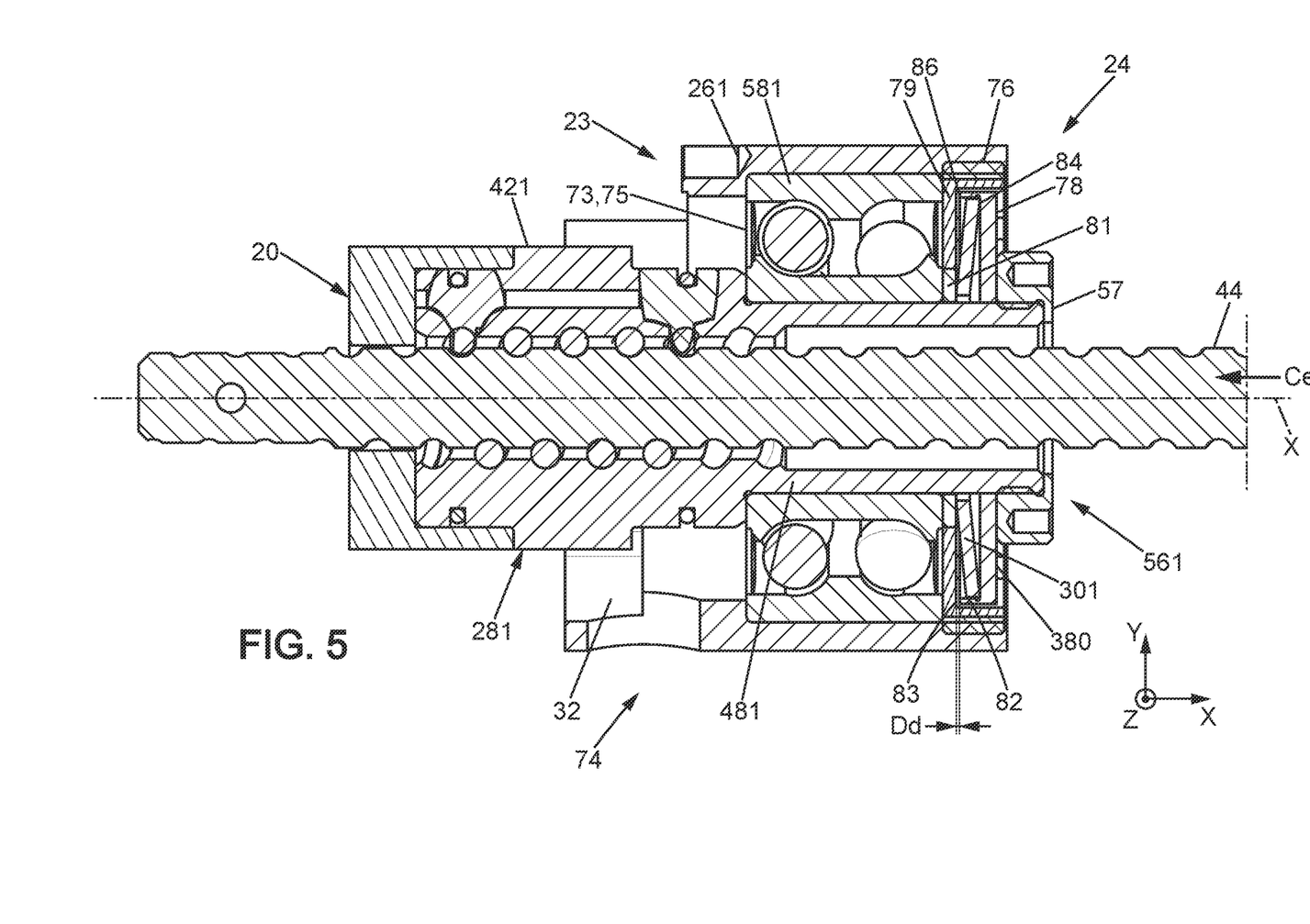
FIG. 5 is an axial section of the second embodiment of the transmission device when the transmission device is in a rest position.

Referring to FIGS. 3 and 5, the transmission device 22 according to a first embodiment comprises a frame 26 including a through-bore 32 extending in an axial direction x, a drive body 28 arranged in the bore 32 of the frame and first 30 and second 31 elastic elements housed in the bore 32 of the frame.

The frame 26 is provided, on the input 23 side, with a first internal shoulder 25 and a first peripheral shoulder 27 arranged in the bore 32. The first internal shoulder 25 has a first bearing face 34 contained in a first radial plane P1. The first peripheral shoulder 27 has a first braking face 36 contained in a second radial plane P2. The second radial plane P2 is arranged at a distance d1 from the first radial plane P1 in the axial direction. The first radial plane P1 is parallel to the second radial plane P2. The first peripheral shoulder 27 is arranged outside of and around the first internal shoulder 25. The vector normal to the first bearing face 34 is oriented towards the input 23, or in other words along the −x direction in the frame of reference (O, x, y, z) illustrated in FIG. 3.

The frame 26 is also provided, on the output 24 side, with a second internal shoulder 33 and a second peripheral shoulder 35. The second internal shoulder 33 has a second bearing face 38 contained in a third radial plane P3. The second peripheral shoulder 35 has a second braking face 40. The second braking face 40 is contained in a fourth radial plane P4 arranged at a distance d3 from the third radial plane P3 in the axial direction. The fourth radial plane P4 is parallel to the third radial plane P3, second radial plane P2, and first radial plane P1. The second peripheral shoulder 35 is located outside of and around the second internal shoulder 33. The vector normal to the second bearing face 38 is oriented towards the output 24, or in other words along the x direction of the frame of reference (O, x, y, z) illustrated in FIG. 3.

The drive body 28 is freely movable in translation along at least the axial direction (x) relative to the frame 26.

The drive body 28 comprises a ball screw nut 42 suitable for being rotated by an actuator 20 (or a drive pinion) about an axis extending in the axial direction, a ball screw 44 driven in translation in the axial direction by the ball screw nut 42, and a support and braking sleeve 46 capable of being made integral with the ball screw nut 42.

The support and braking sleeve 46 comprises a cylindrical casing 48 having a first end 54 located on the input side 23 and a second free end 56 located on the output side 24. The outer face of the second end 56 of the cylindrical casing is threaded. The cylindrical casing 48 lies in the extension of the ball screw nut 42. The cylindrical casing 48 is carried by the frame 26. It can move freely in rotation and in translation relative to the frame 26. It houses part of the ball screw 44.

The support and braking sleeve 46 further comprises a radial wall 50 extending around the first end 54 of the cylindrical casing and a crown 52 extending axially from the radial wall 50.

The radial wall 50 is integral with the cylindrical casing. It extends outwards and forms a collar. The radial wall 50 extends facing the first bearing face 34 of the frame and at least a portion of the first braking face 36 of the frame. The end of one face of the radial wall forms a first braking face 55 of the drive body. This first braking face 55 of the drive body is located facing the first braking face 36 of the frame. A portion of this radial face of the radial wall 50 located facing the internal shoulder 34 forms the first bearing face 62 of the drive body.

The crown 52 is suitable for being fixed to the ball screw nut 42. For this purpose, the internal face of the crown 52 and the external face of the ball screw nut 42 are provided with complementary attachment means such as, for example, internal and external threads.

The support and braking sleeve 46 further comprises a closure nut 57 fixed to the second end 56 of the cylindrical casing, for example by screwing. The closure nut 57 has an axial section of triangular shape. It is screwed onto the second end 56 of the cylindrical casing. The closure nut 57 is screwed in a manner that prestresses the elastic elements 30, 31. The closure nut 57 preloads the elastic elements 30, 31. They are tightened so as to set a relaxation threshold to a given force. This given force is called the threshold load in the remainder of the description. The closure nut forms a radial wall 59. A radial face of the closure nut is arranged facing the second bearing face 38 of the frame. A portion of this radial face forms a second bearing face 65 of the drive body. Another portion of this radial face, located opposite the second braking face 40 of the frame, forms the second braking face 63 of the drive body.

Advantageously, the transmission device 22 comprises at least one bearing arranged between the frame 26 and the drive body 28.

In the embodiment shown, the transmission device 22 comprises a first bearing 60 arranged in the bore 32 between the first bearing face 34 of the frame and elastic element 30. The transmission device 22 also comprises a second bearing 61 arranged in the bore 32 between the second bearing face 38 of the frame and elastic element 31. Preferably, the transmission device 22 comprises a third hollow cylindrical bearing 58 arranged in the bore 32 between the first bearing face 34 of the frame and the second bearing face 38 of the frame.

The first bearing 60 and second bearing 61 are, for example, composed of needle bearings. The third cylindrical bearing 58 is, for example, composed of a cage needle bearing.

The first elastic element 30 is capable of acting between the first bearing face 34 of the frame and the first bearing face 62 of the drive body. In particular, in the embodiment represented, the first elastic element 30 is arranged between the first bearing face 34 of the frame and the first bearing face 62 of the drive body.

The second elastic element 31 is capable of acting between the second bearing face 38 of the frame and the second bearing face 65 of the drive body. In particular, in the embodiment represented, the second elastic element 31 is arranged between the second bearing face 38 of the frame and the second bearing face 65 of the drive body.

When the first elastic element 30 is at rest, the first bearing face 62 of the drive body extends at an axial distance d2 from the first bearing face 34 of the frame. The axial distance d2 is equal to the height of the first elastic element 30 at rest plus the axial width of the first bearing 60.

Similarly, when the second elastic element 31 is at rest, the second bearing face 65 of the drive body extends at an axial distance d4 from the second bearing face 38 of the frame. The axial distance d4 is equal to the height of the second elastic element 31 at rest plus the axial width of the second bearing 61.

In the embodiment shown, the first elastic element 30 comprises two spring washers, for example of the Belleville washer type 66, 68, mounted in opposition to one another around the cylindrical casing 48. The central portion (raised portion) of one spring washer 68 bears against radial wall 50. The central portion (raised portion) of the other spring washer 66 bears against the first bearing 60.

In the same manner, the second elastic element 31 comprises two spring washers, for example of the Belleville washer type 70, 72, mounted in opposition to one another around the cylindrical casing 48. The central portion (raised portion) of one spring washer 72 bears against radial wall 59. The central portion (raised portion) of the other spring washer 70 bears against the second bearing 61.

The first 30 and second 31 elastic elements each have a stiffness determined according to a threshold load at which the user wishes the transmission device 22 to brake or stop the movement of the ball screw 44.

Alternatively, the first elastic element 30 consists of a single Belleville washer and the second elastic element 30 consists of a single Belleville washer.

Alternatively, the first 30 and second 31 elastic elements include compression springs, spring strips, etc.

Alternatively, the first elastic element 30 and the second elastic element 31 are different from each other. In particular, they may have different stiffness coefficients.

Alternatively, the ball screw nut 42 and the support and braking sleeve 46 are formed as one piece.

Alternatively, the distances d1 and d3 and/or the distances d2, d4 are different from each other.

In operation, the drive body 28 is rotatable relative to the fixed frame 26. The actuator 20 drives the rotation of the ball screw nut 42 and the drive body 28 integral with the ball screw nut 42. The ball screw nut 42 drives the ball screw 44 in translation. The drive body 28 is rotatable relative to the fixed frame 26.

When an axial load Cs is applied to the ball screw 44 in a direction oriented towards the output 24, the first elastic element 30 is compressed. The axial load Cs has a direction opposite to the vector normal to the first bearing face 34 of the frame (x direction in the frame of reference illustrated in FIG. 3). The axial load Cs is external to the transmission device 22. It is greater than a threshold load. The first elastic element 30 is compressed by an axial distance at least equal to the difference between distance d2 and distance d1. The difference between distance d2 and distance d1 forms a defined distance Dd. The first braking face 55 of the drive body comes into contact with the first braking face 36 of the frame. The first braking face 55 of the drive body rubs against the first braking face 36 of the frame and thereby slows the rotation of the drive body 28.

Similarly, when an axial load Ce is applied to the ball screw 44 in a direction oriented towards the input 23, the second elastic element 31 is compressed. The axial load Ce has a direction opposite to the vector normal to the second bearing face 38 of the frame (−x direction in the frame of reference illustrated in FIG. 3). The axial load Ce is external to the transmission device 22. It is greater than a threshold load. The second elastic element 31 is compressed by an axial distance at least equal to the difference between distance d4 and distance d3. The second braking face 63 of the drive body comes into contact with the second braking face 40 of the frame. The second braking face 63 rubs against the second braking face 40 of the frame and thereby slows the rotation of the drive body 28.

Thus, in the event of sudden loads being applied, corresponding to an emergency stop or to people sitting down heavily, the support and braking sleeve 46 rubs against the frame 26 and absorbs part of the impact, thus protecting the kinematic chain of the seat. The transmission device 22 is capable of slowing the driving of the ball screw 44 regardless of the direction of the external load applied to the transmission device.

The disclosure also relates to an aircraft seat 2 comprising a transmission device 74 according to a second embodiment of the disclosure. This transmission device 74 is similar to the transmission device 22 according to the first embodiment except that it is suitable for braking the driving of the ball screw only when loads having a given direction are applied to the device.

Figure 4:
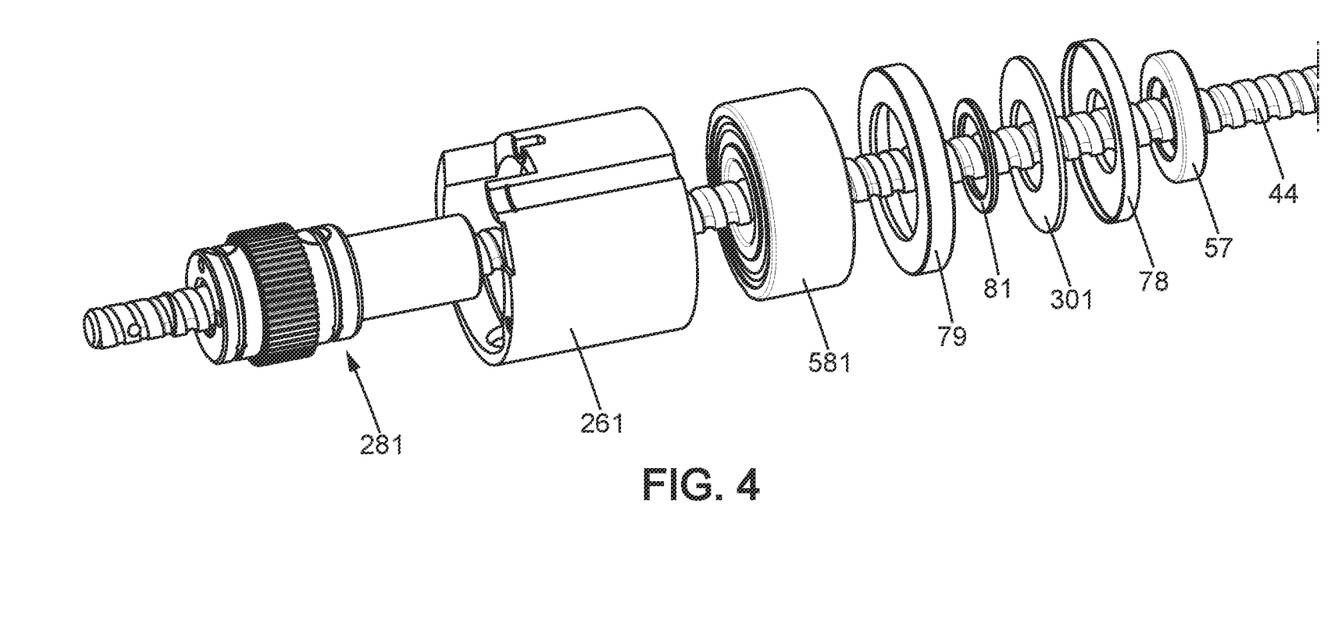
FIG. 4 is an exploded perspective view of a second embodiment of a transmission device of the seat illustrated in FIG. 1.

FIGS. 4 and 5 show an example of such a transmission device 74 capable of slowing the driving of the ball screw only for loads Ce directed towards the input (−x direction with respect to the frame of reference (O,x,y,z).

The elements of the transmission device 74 according to the second embodiment which are identical or similar to the elements of the transmission device 22 according to the first embodiment bear the same references and are not described a second time.

The transmission device 74 comprises a frame 261 and a drive body 281. The frame 261 includes an internal shoulder 73 located in the bore 32. The internal shoulder 73 forms a bearing face 75 which extends radially relative to the axial direction x. The drive body 281 includes a ball screw nut 421 which is extended axially by a cylindrical casing 481 housing part of the ball screw 44.

The transmission device 74 further comprises a bearing 581 and a thrust washer 81 which are arranged in the bore 32 around the cylindrical casing 481. The bearing 581 comprises an outer ring bearing against the bearing face 75 and an inner race, the inner ring being able to rotate with the drive body 281. The thrust washer 81 bears against the inner ring of the bearing.

The transmission device 74 further comprises a braking ring 76 suitable for being made integral with the frame. The braking ring 76 comprises a skirt 79 extending radially inwards to the thrust washer 81. The skirt 79 bears against the edge of the thrust washer 81 and lies in the extension thereof. A portion of the radial face of the skirt 79 forms the braking face 83 of the frame. In the embodiment shown, the braking ring 76 is screwed into the bore 32 of the frame 261. For this purpose, the braking ring 76 comprises an external thread and the bore is provided with an internal thread.

The transmission device 74 further comprises an elastic element 301, a support ring 78, and a closure nut 57 that is fixed to the free end 561 of the cylindrical casing 481, for example by screwing.

The support ring 78 is force-fitted around the cylindrical casing 481. The support ring 78 is driven in rotation by the drive body. The support ring 78 extends radially around the axial direction x. It forms a radial wall 380. The elastic element 301 bears against a radial face of the support ring 78. This radial face is a bearing face 84 of the drive body.

The support ring 78 is provided with a peripheral flange 82. The peripheral flange 82 extends axially towards the skirt 79 of the brake ring. The end face of the peripheral flange forms a braking face 86 of the drive body. The braking face 86 of the drive body extends facing the braking face of the frame.

The elastic element 301 is arranged in the housing formed by the support ring 78 and the peripheral flange 82. The height of the elastic element 301 at rest is greater than the axial length of the flange 82 such that the braking face 86 of the drive body is arranged at a defined distance Dd from the braking face of the frame when the elastic element 301 is at rest.

The elastic element 301 is for example composed of a spring washer of the Belleville washer type. The central portion (raised portion) of the elastic element 301 bears against the thrust washer 81. The peripheral edge of the elastic element 301 bears against the peripheral flange 82.

The degree of screwing of the closure nut 57 on the free end 561 of the cylindrical casing 481 makes it possible to adjust the threshold for triggering the flattening of the elastic element 301.

Alternatively, the elastic element 301 comprises two spring washers mounted in opposition, for example two Belleville washers.

In operation, the ball screw nut 421 is driven in rotation by the actuator 20 so as to drive the ball screw 44 in translation. The closure nut 57, the support ring 78, the elastic element 301, the thrust washer 81, and the inner ring of the bearing 581 are driven in rotation.

When an axial load Ce greater than a threshold load is applied to the ball screw 44, the elastic element 301 flattens. The braking face 86 of the drive body comes into contact with the braking face 83 of the frame. The braking face of the drive body rubs against the braking face 83 of the frame and slows down or stops the rotation of the ball screw nut.

Alternatively, the disclosure also relates to devices capable of braking the driving only for loads Cs directed towards the output (−x direction with respect to the frame of reference (O,x,y,z).

The invention claimed is:

1. An aircraft seat comprising:
    at least one actuator configured to generate movement; and
    at least one movement transmission device comprising:
    a frame provided with a through-bore extending in an axial direction;
    a drive body suitable for being rotated relative to the frame about an axis extending in an axial direction, said drive body being arranged in the bore,
    wherein said frame comprises at least one bearing face and at least one braking face, and wherein the drive body is arranged in the bore to move freely in translation along at least the axial direction relative to the frame, said drive body comprising at least one bearing face facing the bearing face of the frame and at least one braking face facing at least part of the braking face of the frame; and
    at least one elastic element arranged between said at least one bearing face of the frame and said at least one bearing face of the drive body in order to keep said at least one braking face of the drive body at a defined distance from said at least one braking face of the frame, said at least one elastic element having a determined stiffness and being prestressed such that, when an axial load greater than a threshold load is applied to the drive body, said elastic element is compressed and said at least one braking face of the drive body comes into contact with said at least one braking face of the frame.

2. The aircraft seat according to claim 1, wherein said elastic element comprises at least one spring washer.

3. The aircraft seat according to claim 1, wherein said elastic element comprises two Belleville washers mounted in opposition to each other.

4. The aircraft seat according to claim 1, wherein the transmission device comprises at least one bearing arranged between the bearing face of the frame and said at least one elastic element.

5. The aircraft seat according to claim 1, wherein the drive body comprises:
    a ball screw nut;

a ball screw suitable for being driven in translation by the ball screw nut;

a cylindrical casing which lies in the extension of the ball screw nut, said cylindrical casing comprising a first end integral with the ball screw nut and a second free end; and a radial wall integral with at least one end of the cylindrical casing, said at least one braking face, and said at least one bearing face of the drive body being arranged on said radial wall.

6. The aircraft seat according to claim 5, comprising a closure nut suitable for being made integral with the second end of the cylindrical casing, the closure nut being configured to prestress said at least one elastic element.

7. The aircraft seat according to claim 6, wherein the braking face and bearing face of the drive body are arranged on a radial face of said closure nut.

8. The aircraft seat according to claim 5, wherein the cylindrical casing comprises a crown extending axially from the end of the radial wall, said crown being configured to be fixed to the ball screw nut.

9. The aircraft seat according to claim 1, wherein the frame comprises at least one internal shoulder contained in a first radial plane and at least one peripheral shoulder arranged around said at least one internal shoulder and contained in a second radial plane, said second radial plane being offset axially relative to the first radial plane; and wherein said at least one bearing face of the frame is formed by said at least one internal shoulder and said at least one braking face of the frame is formed by said at least one peripheral shoulder.

10. The aircraft seat according to claim 5, wherein the transmission device comprises a support ring arranged around the cylindrical casing, the support ring forming the radial wall, the bearing face of the drive body being a radial face of said support ring.

11. The aircraft seat according to claim 10, wherein said support ring is provided with a peripheral flange extending axially, the end face of the peripheral flange forming the braking face of the drive body.

12. The aircraft seat according to claim 5, wherein the frame comprises a bearing face extending radially and wherein the transmission device comprises a bearing and a thrust washer which are arranged in the bore around the drive body; the bearing having an inner ring and an outer ring, the outer ring of the bearing resting against the bearing face of the frame, the thrust washer resting against the inner ring of the bearing.

13. The aircraft seat according to claim 11, wherein the transmission device further comprises a braking ring provided with a skirt extending radially inwards, a radial face of said skirt being arranged facing the braking face of the drive body, a portion of said radial face of the skirt forming the braking face of the frame.

14. An aircraft seat, comprising:
at least one actuator configured to generate movement; and
at least one movement transmission device comprising:
a frame provided with a through-bore extending in an axial direction;
a drive body suitable for being rotated relative to the frame about an axis extending in an axial direction, said drive body being arranged in the bore,
wherein said frame comprises at least one bearing face and at least one braking face, and wherein the drive body is arranged in the bore to move freely in translation along at least the axial direction relative to the frame, said drive body comprising at least one bearing face facing the bearing face of the frame and at least one braking face facing at least part of the braking face of the frame;
at least one elastic element arranged between said at least one bearing face of the frame and said at least one bearing face of the drive body in order to keep said at least one braking face of the drive body at a defined distance from said at least one braking face of the frame, said at least one elastic element having a determined stiffness and being prestressed such that, when an axial load greater than a threshold load is applied to the drive body, said elastic element is compressed and said at least one braking face of the drive body comes into contact with said at least one braking face of the frame;
wherein the drive body comprises:
a ball screw nut;
a ball screw suitable for being driven in translation by the ball screw nut;
a cylindrical casing which lies in the extension of the ball screw nut, said cylindrical casing comprising a first end integral with the ball screw nut and a second free end; and
a radial wall integral with at least one end of the cylindrical casing, said at least one braking face, and said at least one bearing face of the drive body being arranged on said radial wall.

* * * * *